(12) United States Patent
Farb

(10) Patent No.: US 10,330,086 B2
(45) Date of Patent: Jun. 25, 2019

(54) VERTICAL AXIS TURBINE CLUSTERING

(71) Applicant: Daniel Farb, Beit Shemesh (IL)

(72) Inventor: Daniel Farb, Beit Shemesh (IL)

(*) Notice: Subject to any disclaimer, the term of this patent is extended or adjusted under 35 U.S.C. 154(b) by 290 days.

(21) Appl. No.: 15/310,770

(22) PCT Filed: May 21, 2015

(86) PCT No.: PCT/IL2015/050537
§ 371 (c)(1),
(2) Date: Nov. 13, 2016

(87) PCT Pub. No.: WO2015/177798
PCT Pub. Date: Nov. 26, 2015

(65) Prior Publication Data
US 2017/0089326 A1 Mar. 30, 2017

Related U.S. Application Data

(60) Provisional application No. 62/001,103, filed on May 21, 2014.

(51) Int. Cl.
| F03D 80/00 | (2016.01) |
| F03D 3/00 | (2006.01) |
| F03D 3/06 | (2006.01) |
| F03D 7/06 | (2006.01) |
| F03D 9/25 | (2016.01) |

(52) U.S. Cl.
CPC ............ *F03D 80/00* (2016.05); *F03D 3/005* (2013.01); *F03D 3/061* (2013.01); *F03D 7/06* (2013.01); *F03D 9/257* (2017.02); F05B 2230/60 (2013.01); F05B 2240/211 (2013.01); F05B 2240/40 (2013.01); Y02E 10/74 (2013.01); Y02P 70/523 (2015.11)

(58) Field of Classification Search
CPC . F03D 3/005; F03D 3/02; F03D 3/007; F03D 9/257
See application file for complete search history.

(56) References Cited

U.S. PATENT DOCUMENTS

| 1,697,574 | A | * | 1/1929 | Savonius | F03D 3/007 416/110 |
| 4,359,311 | A | * | 11/1982 | Benesh | F03D 3/061 416/197 A |
| 4,830,570 | A | * | 5/1989 | Benesh | F03D 3/02 415/4.4 |
| 6,784,566 | B2 | * | 8/2004 | Thomas | F03D 3/02 290/55 |
| 2009/0202346 | A1 | * | 8/2009 | Baron | F03D 3/068 416/9 |
| 2014/0100784 | A1 | * | 4/2014 | Thomas | F03D 3/02 702/5 |
| 2015/0104293 | A1 | * | 4/2015 | Craig | F03G 7/00 415/4.4 |
| 2017/0107975 | A1 | * | 4/2017 | Wolf | F03D 13/10 |

* cited by examiner

*Primary Examiner* — Dwayne J White
*Assistant Examiner* — Jackson N Gillenwaters

(57) ABSTRACT

One of the barriers to greater adoption of small turbines is their aerodynamic interference with each other, and hence the need to separate them. Certain types of vertical axis turbines, the drag types, can actually enhance each other's performance when placed close to each other under the right conditions.

14 Claims, 11 Drawing Sheets

VERTICAL AXIS TURBINE CLUSTERING

STATEMENT REGARDING PRIOR DISCLOSURES BY THE INVENTOR OR A JOINT INVENTOR

This patent application claims the benefit of U.S. Provisional Patent Application No. 62/001,103, entitled Provisional 5-2014 Wind Farm Optimization, filed May 21, 2014.

CROSS REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not applicable

BACKGROUND OF THE INVENTION

The present invention relates to clustered turbines, particularly drag vertical axis ones. The primary use is for wind, but also other fluids such as water. This is a new way to look at drag type vertical axis turbines, as an interactive system whereby the parameters of the wind farm can be adjusted to increase the total power output. Historically, a challenge for wind turbines has been that they interfere with each other aerodynamically by creating turbulent wakes. That continues to be a problem for all horizontal axis wind turbines. Vertical axis lift wind turbines have a similar problem in terms of creating turbulence. An area of recent inquiry has been how to use those types of turbines and their resulting turbulence to advantage.

We know of no one who has applied the clustering approach to drag type turbines.

U.S. Pat. No. 8,545,168 B2 discussed wind farms of vertical axis lift turbines. The fact that U.S. Pat. No. 8,545,168 B2 referred to lift and this invention is for drag is sufficient to distinguish by structure, especially since drag blades have a leading and trailing edge and are cup-shaped. There are additional differentiations. U.S. Pat. No. 8,545,168 B2 basically concerns only rows of turbines and not the distances between them. This application is about drag only (although some method claims without prior art in U.S. Pat. No. 8,545,168 B2 do refer as well to lift turbines) so there is no overlay).

The main claim of U.S. Pat. No. 8,545,168 B2 is for rows of counter-rotating turbines. That patent is additionally not prior art because U.S. Pat. No. 8,545,168 B2 involves making certain array's of turbines that are all counter-rotating next to each other, so the arrangements in the current application are unique because counter-rotation is limited item to specific circumstances. In addition, we show later that U.S. Pat. No. 8,545,168 B2's prescription for counter-rotation would actually cause the performance of drag-type turbines to decrease throughout most of a wind farm. There is one case which we point out in which counter-rotation would be useful, with just the periphery on one side.

Vertical axis wind turbines of the predominantly drag type have a different science than that of horizontal axis. One is that wake effects differ. The turbines in this invention should be considered to be of the same size and shape, but not necessarily confined to that.

BRIEF SUMMARY OF THE INVENTION

The present invention addresses the shortcomings of the presently known configurations by providing an array of wind turbines in specific, higher performance relationships.

It is now disclosed for the first time a system of a plurality of vertical axis turbines, with a solidity of 20% or greater, comprising central shafts and peripheral blades with a trailing and leading edge meeting at an inner and outer edge, said out edge being the perimeter of the turbine's rotation, comprising: Turbine 1, a drag turbine of a counterclockwise or clockwise rotation, and Turbine 2, of substantially the same diameter as turbine 1, disposed in 35-90 degrees relationship to Turbine 1 in the face of a fluid flow coming from 180 degrees at any time in its orientation of flow, whose perimeter when closest to the perimeter of Turbine 1 is located at a distance from the shaft of Turbine 1 of the radius of Turbine 1 times approximately 1.05-1.6.

According to another embodiment, the solidity of turbine 1 is 60% or more and the distance from the center of the shaft of Turbine 1 to the perimeter of turbine 2 is the radius of Turbine 1 times approximately 1.2. According to another embodiment, Turbine 2 is rotating counterclockwise and to the left of turbine 1 facing the flow, or clockwise and to the right, According to another embodiment, Turbine 2 is rotating counterclockwise and to the right of turbine 1 facing the wind, or clockwise and to the left. According to another embodiment, the perimeter of Turbine 2 is located from 1.05 to 125 times the radius of Turbine 1 from the center of the shaft of Turbine 1. According to another embodiment, the perimeter of Turbine 2 is located from 1.4 to 1.6 times the radius of Turbine 1 from the center of the shaft of Turbine 1. According to another embodiment, Turbine 2 is in a second row and recessed from the perpendicular line of Turbine 1 away from the direction of flow. According to another embodiment, the angle from the direction of prevailing flow to a virtual line connecting the shafts of Turbines 1 and 2 is approximately 45 or 135 degrees. According to another embodiment, Turbine 2 is a drag turbine. In one embodiment, the system further comprises an additional Turbine 3 at approximately 90 or 270 degrees to Turbine 1 in relation to the flow. In one embodiment, the system further comprises an additional Turbine 4 approximately 90 or 270 degrees to Turbine 2 in relation to the flow. According to another embodiment, the shaft of an other turbine in the first line of flow is at approximately 135 or 225 degrees to the shaft of Turbine 2. According to another embodiment, Turbines 1 and 2 rotate in the same direction. According to another embodiment. Turbine 1 rotates counterclockwise and Turbine 2 is to its right and rotates clockwise, or Turbine 1 rotates clockwise and Turbine 2 is to its left and rotates counterclockwise.

It is now disclosed for the first time a method of placing a plurality of drag vertical axis turbines possessing central shafts and blades with a peripheral edge, disposed in relation to the wind coming from 180 degrees at any nm e in its orientation, comprising: Providing Turbine 1, and Providing Turbine 2 downwind from Turbine 1, wherein the majority of Turbine 2 is located greater than the angle of 30 degrees or less than the angle of 330 degrees in relation to the direction of wind in the line connecting the shafts of the turbines. According to another embodiment, Turbine 1 is rotating counterclockwise and Turbine 2 is rotating counterclockwise and is located to the left, or Turbine 2 is rotating clockwise and is located to the right, or the exact reverse of said conditions.

It is now disclosed for the first time a method of situating at least two vertical axis drag turbines, wherein a second turbine is downwind from a first turbine, wherein part of the second turbine, along its leading edge, is in the area of circular turbulence downwind from the first turbine.

It is now disclosed for the first time a method of making a turbine which creates a substantially vertically similar adjacent area of higher fluid speed than prevailing fluid speed in the near vicinity of the turbine, at a similar distance from the center of the turbine at different heights of said turbine, comprising, Providing a drag vertical axis turbine, wherein said turbine has variations in diameter combined with variations in shape at each diameter for each height.

It is now disclosed for the first time a method of placing a turbine in a second row downwind of a plurality of first row turbines, wherein the majority of at least one blade of a second-row turbine is in the region of uniform flow from between the turbines in the front row. According to another embodiment, the turbine in row 2 has the same rotational direction as row 1.

It is now disclosed for the first time a method of placing a plurality of turbines for maximal power output, comprising: At least 2 turbines in the first row, and a second turbine, downwind and to the side of the first row of turbines, wherein the first row turbines are rotating counterclockwise, and the second row turbine is to the right and rotating clockwise, or to the left and the second row turbine is rotating counterclockwise, or the reverse, that is, first row turbines are rotating clockwise, and the second row turbine is to the left and rotating counterclockwise, or to the right and rotating clockwise, wherein the trailing edge of the blades of the second turbine is predominantly in the region of the prevailing wind speed to the side and downwind of the front row turbine, and the leading edge of the blades of the second turbine is predominantly in the region of circular turbulence to the side and downwind of the first row.

It is now disclosed for the first time a method of placing a plurality of drag vertical axis turbines for maximal energy production comprising a plurality of turbines in the first row arranged perpendicular to the wind, at least one in a second row adjacent and peripheral to one side in the first row at a distance from the perimeter of a second-row turbine of 1.05 to 1.6 times the radius of the first turbine to the shaft of the earlier row turbine.

It is now disclosed for the first time a method of coordinating the interaction among the blades of an energy farm with vertical axis turbines, comprising the steps of providing at least two turbines within less than a blade diameter's distance from each other, and providing a microprocessor with memory that receives information on at least the blade positions and wind speed and direction, and coordinating by means of the microprocessor output the position of the blades in respect to each other.

It is now disclosed for the first time a method of placing vertical axis drag turbines in a farm, providing a first and second row of turbines, wherein a turbine in the second row is partially in the wake of a turbine of the first row and partially not in said wake, and the trailing edge of the blades of a turbine in the second row is in the direction of the fluid flow outside the wake.

It is now disclosed for the first time a method of increasing the electrical output of at least two turbines in at least two rows in an energy farm, wherein at least half the diameter of a turbine of the second row is placed in an area of higher wind speed adjacent to and behind the first turbine and said area of higher wind speed is oriented towards the trailing edges.

It is now disclosed for the first time a method of arranging a plurality of vertical as drag turbines, comprising similar shapes and sizes, with solidity 20% or greater, providing the placement of the turbines at a distance from the central shaft of one to the perimeter of the other of 1.05-1.6 times the radius.

It is now disclosed for the first time a method of approximating turbines in a flow from 180 degrees, comprising the steps of providing at least one turbine at a right angle to the first turbine on either side, and placing the turbines at less than 3 blade diameters from the shaft of one turbine to the one on its side, and coordinating the movement of the blades of adjacent turbines with at least one of the group of: angling a blade of turbine 2 at approximately the midpoint position of the angle of two blades of turbine 1, steering the angle of the blades so that the angles of adjacent turbines are at different angels, providing different revolutions per minute of the turbines. In one embodiment, the method further comprises: (d) Placing a flow deflection device adjacent to any of the turbines. According to another embodiment, the turbines are 2 blade diameters or less from shaft to shaft.

It is no disclosed for the first time a method of arranging vertical axis drag turbines in a farm, each turbine having a solidity of 20% or greater, and the distance from the shaft of a first turbine to the perimeter of a second turbine being the radius of the first turbine times 1.05-1.6, in the presence of a limited number of turbines, by the step of providing as many turbines as possible in a row perpendicular to the wind before placing more in a second row.

BRIEF DESCRIPTION OF SEVERAL VIEWS OF THE DRAWINGS

The invention is herein described, by way of example only, with reference to the accompanying drawings, wherein.

DETAILED DESCRIPTION OF THE INVENTION

The present invention provides innovative solutions for obtaining the maximum output from small vertical axis drag turbines by looking at them as a system of synergistic clustering. Such clustering enables more power to be created in a confined location. The patent applies to any fluid. We simply use "wind" here as the most common application, but any use of "wind" refers to other fluids as well.

Figure 8:
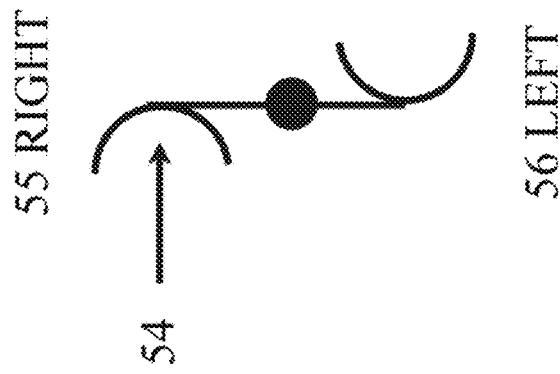
FIG. 8 is a diagram of the conventions of right and left shown in the patent.

Definitions: The leading edge is the part of a blade that is in front. The trailing edge is behind. The trailing edge captures the wind in a drag turbine. It is a variation on a cup. In FIG. 8, (54) represents the direction of the wind hitting the trailing edge. For the sake of clarity, the turbine faces the wind coming from 180 degrees, so that (55) is the right side and (56) the left.

A lift turbine is like a wing and moves not from the cupping of the fluid stream at the trailing edge, but from aerodynamic effects of movement towards low-pressure zones created by the shape of the blade or wing. Therefore, lift and drag turbines have dissimilar structures.

We will refer to the wind approaching the turbine from 180 degrees. Therefore right is at 90 and left at 270. This enables us to emphasize that the wind can come from an direction, but that the arrays are in a predominant direction of the wind in relation to the turbines.

Figure 9:
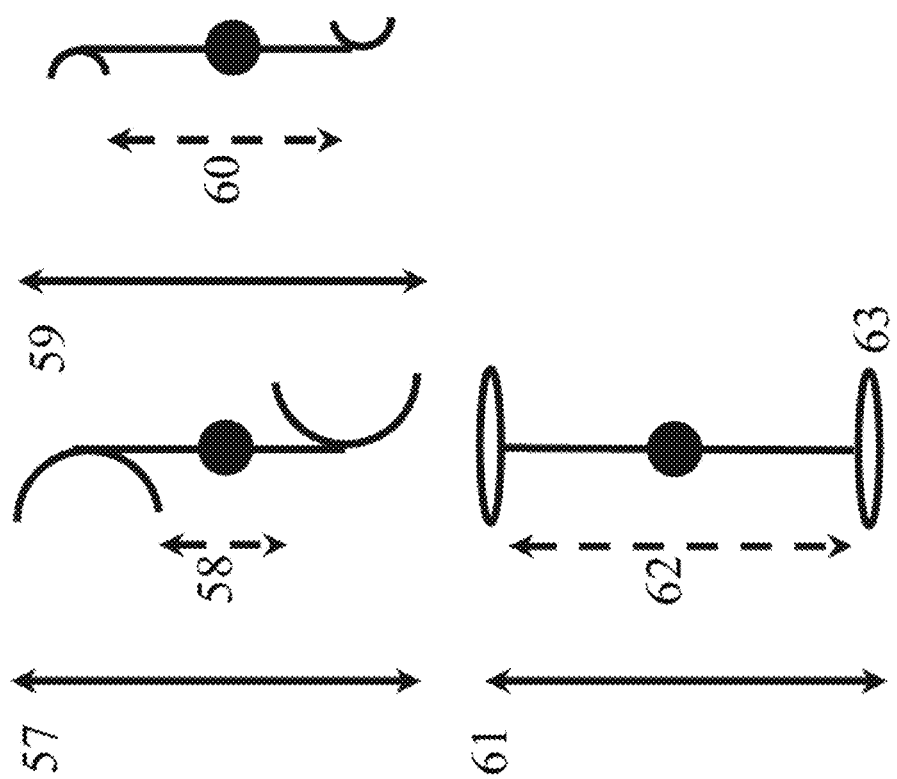
FIG. 9 is a diagram of the definition of solidity.

Solidity: The turbines in this patent are drag, vertical axis turbines. Therefore, they usually have a greater amount of solidity because they are cup-shaped instead of wing shaped and need to contain as much fluid flow as possible, in general. FIG. 9 illustrates that (57), (59), and (61) are turbine diameters. (58), (60), and (62) are the open spaces between the blades, which is generally much less in a drag turbine than a lift turbine and the solidity is the proportion of (57) minus (58) divided by (57), which is here around 80%. The solidity is the percentage of turbine blade that blocks the theoretical straight path of the fluid through the turbine. In a low solidity drag turbine, the ratio of diameter (59) minus open space (60) divided b (59) is much lower, around 40%. That low solidity means there will be less of a cluster effect from diversion of flow to the sides. We will exclude 20% solidity or below from this invention because of that. For the purpose of simplicity in explaining the diagrams, the impact of the shaft is ignored. Much lower solidity is usually present in lift vertical a turbines. Their blades (63) are long and thin structures that create a wing-like lift effect. Here the open space (62) is almost equal to that of the diameter (61) so that the solidity is around 10%.

Clockwise and counterclockwise are used for examples of turbines when rotating in groups. However the exact same situation can exist when the roles of the turbines are reversed. So the language is for convention to make comparisons.

The principles and operation of a farm of vertical axis drag turbines according to the present invention may be better understood with reference to the drawings and the accompanying description.

Figure 1:
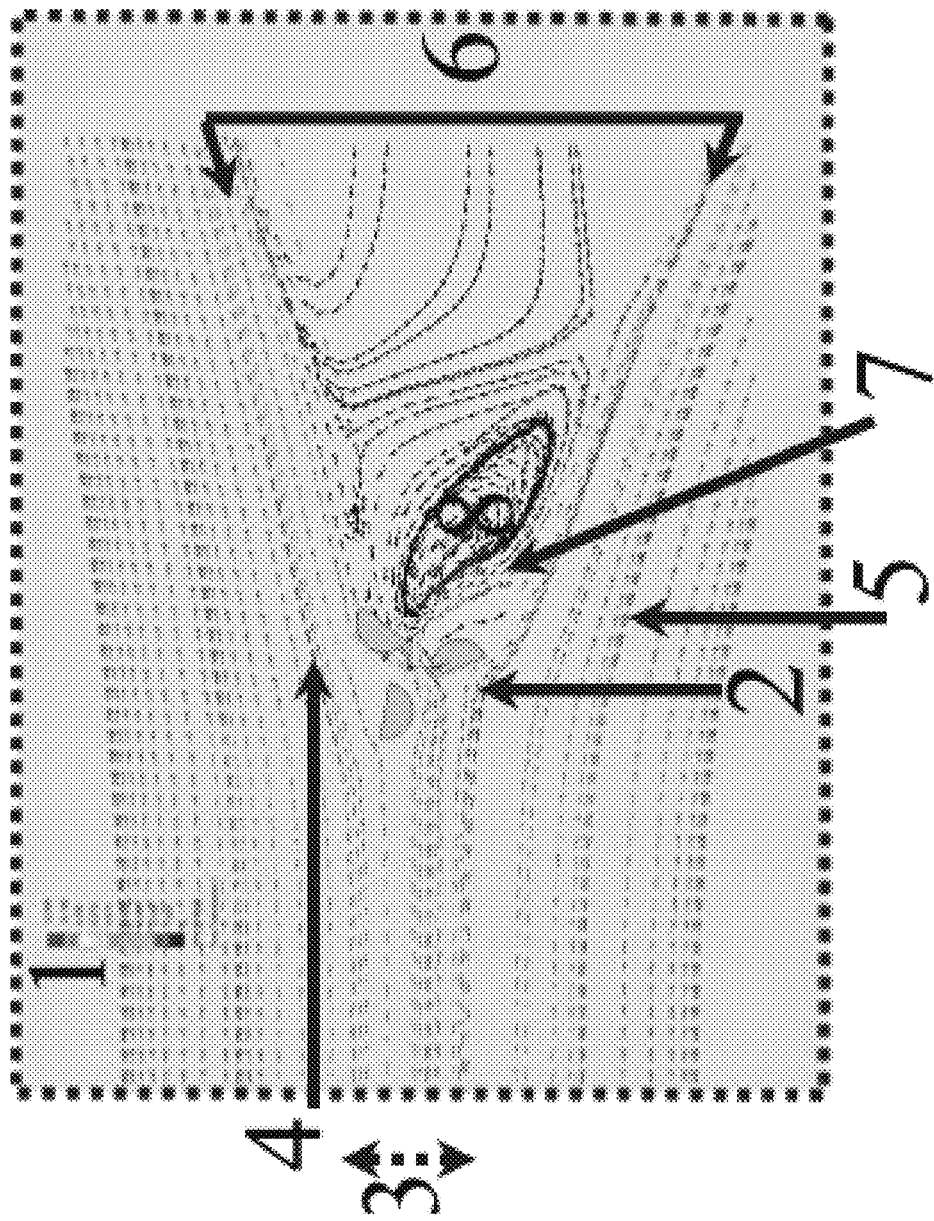
FIG. 1 is a diagram of a single vertical axis 3-bladed turbine in the wind.

Referring now to the drawings, FIG. 1 illustrates a 3 bladed wind turbine of drag type (2) while spinning from the wind. The wind is coming form the left. Element (1) shows the scale of the wind speeds shown from the interaction of the turbine and the wind from lower to higher wind speed on the top. This was originally in color; for the sake of the patent figure rules, the relevant parts are numbered and discussed. Element (3) is a dotted line showing the diameter of the turbine. The turbine is shown rotating counterclockwise. Facing the direction of wind, point (4) is where the wind on the right has attained high speed after losing speed in the area of the turbine. It extends to around a 150-degree angle to the wind from the shaft of the turbine. Point (5) is the same on the left. Note that on the left, a partial recovery of speed has occurred closer to the turbine than point (5), but it is farther away that maximal speed returns. On the right side, the recovery of high speed to equal to or greater than the prevailing wind is about 0.05 to 0.25 times the turbine diameter from the outer part of the turbine in the plane perpendicular to the direction of wind at the axis of the turbine On the left, the recovery is at around a ratio of 0.4 to 0.6 times the turbine diameter in the plane perpendicular to the direction of wind at the axis of the turbine. Theoretical line (6) shows that the angle from the sides of the turbine where the wake of turbulent vortices (8 is the most intensive example) is present fans out at 15-30 degrees on both sides from the turbine. This is a fairly typical picture of wakes seen from wind turbines. It is notable that the area of greatest circular turbulence is confined to area (8). Point (7) shows an adjacent region where the velocity of wind is more uniform and slightly higher than that of the turbulent area on one side, and where the deflection of the wind from the turbine to its left is starting to increase in velocity. That suggests that placing a second row of turbines of similar rotational direction with a shaft in the area of point (7) would enable such a turbine to benefit from both the areas of internal pass-through wind in between the turbine blades and the deflected wind from the turbine, while also benefiting from decreased resistance if its blades pass through the area shown as (8) in a counterclockwise direction. Point (7) is at the edge of an area of circular turbulence, where the wind vectors are just starting to straighten out. There is a similar interface downwind and to the right of the turbine. Since the wind becomes higher speed to the outside of points (4) and (5) in approximately the plane of the blades, those regions would be ideal for placing adjacent turbines that would experience higher wind speeds, and thus a greater production of electricity, than each turbine individually. Vertical axis turbines normally have the disadvantage of having to resist wind of the same speed on the return journey as their leading edges face the wind instead of the trailing edges capturing it; the figures here that show a wind farm operating as a system show how this disadvantage can be minimized by proper placement of turbines in relation to each other.

Figure 11:
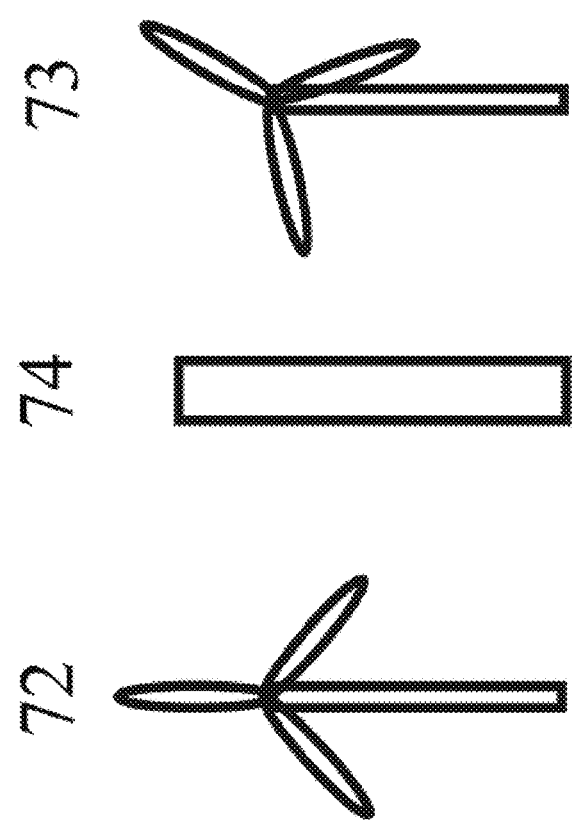
FIG. 11 is a diagram of blade position coordination with a flow deflection device.

The subject of wakes is also important for horizontal axis turbines, and it is here that we can adopt some approaches that apply to vertical axis turbines as well. The standard practice has been to separate horizontal axis turbines even in the same row perpendicular to the prevailing wind at 3-5 blade diameters apart to avoid negative wake interactions. FIG. 11 suggests two methods of bringing blades closer that apply to vertical axis turbines as well. The blades of turbines can be coordinated so that they are at different angles to the direction of wind at the same time. FIG. 11 illustrates that with two horizontal axis turbines, (72) and (73) whose blades are at different angles at the same time. Their steering effects (the angling of the blades towards the wind) and the revolutions per minute can also affect the wakes. Another method is to use a flow deflection device, in any relationship to the turbines, whether upwind to affect the power or at right angles to block the wakes, as is shown in (74), in coordination with any of these methods. Using such methods, a distance between adjacent turbines of 2 blade diameters even for horizontal axis turbines could be achievable.

Figure 2:
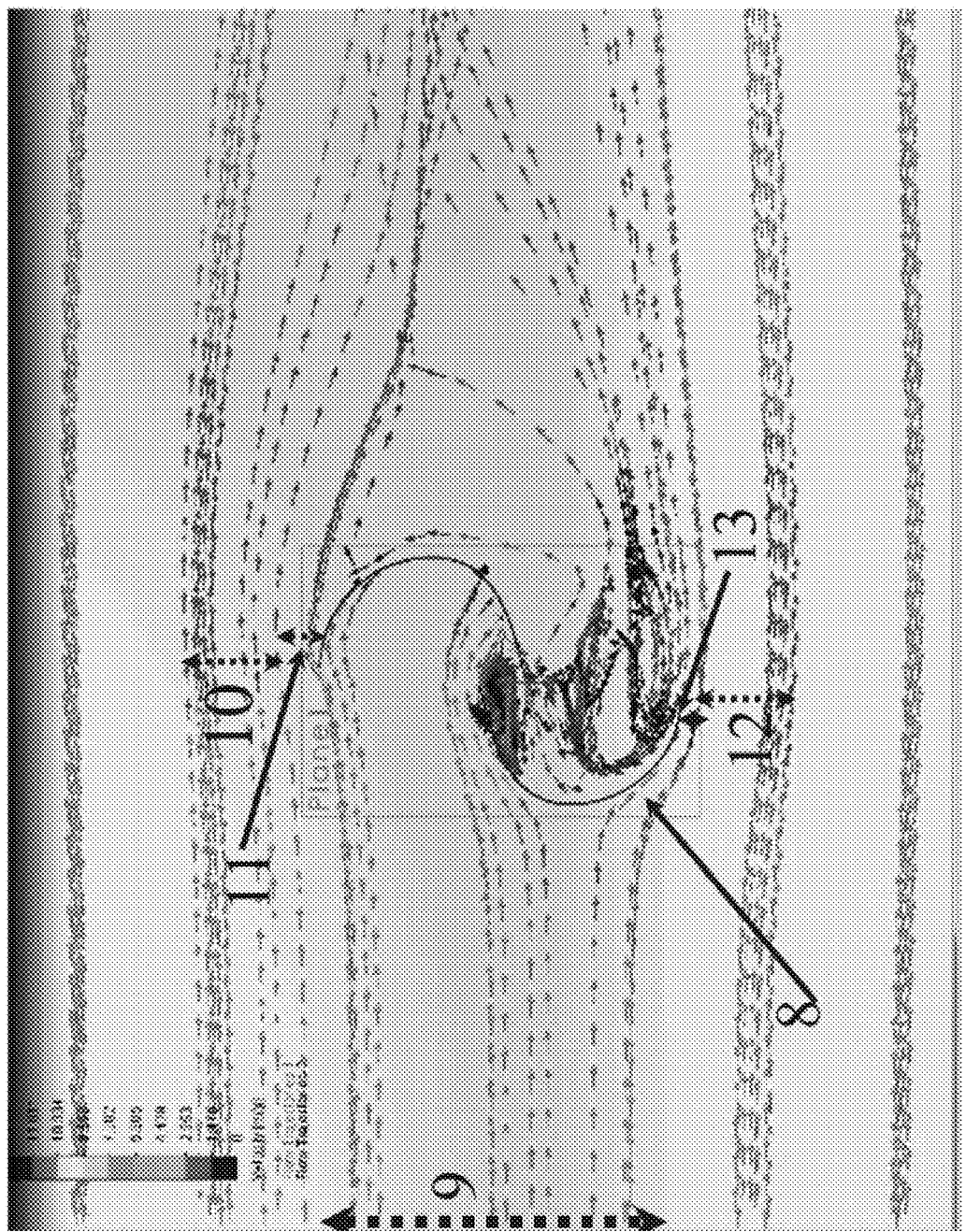
FIG. 2 is a diagram of the flow around a 2-bladed turbine in one plane.
Figure 3:
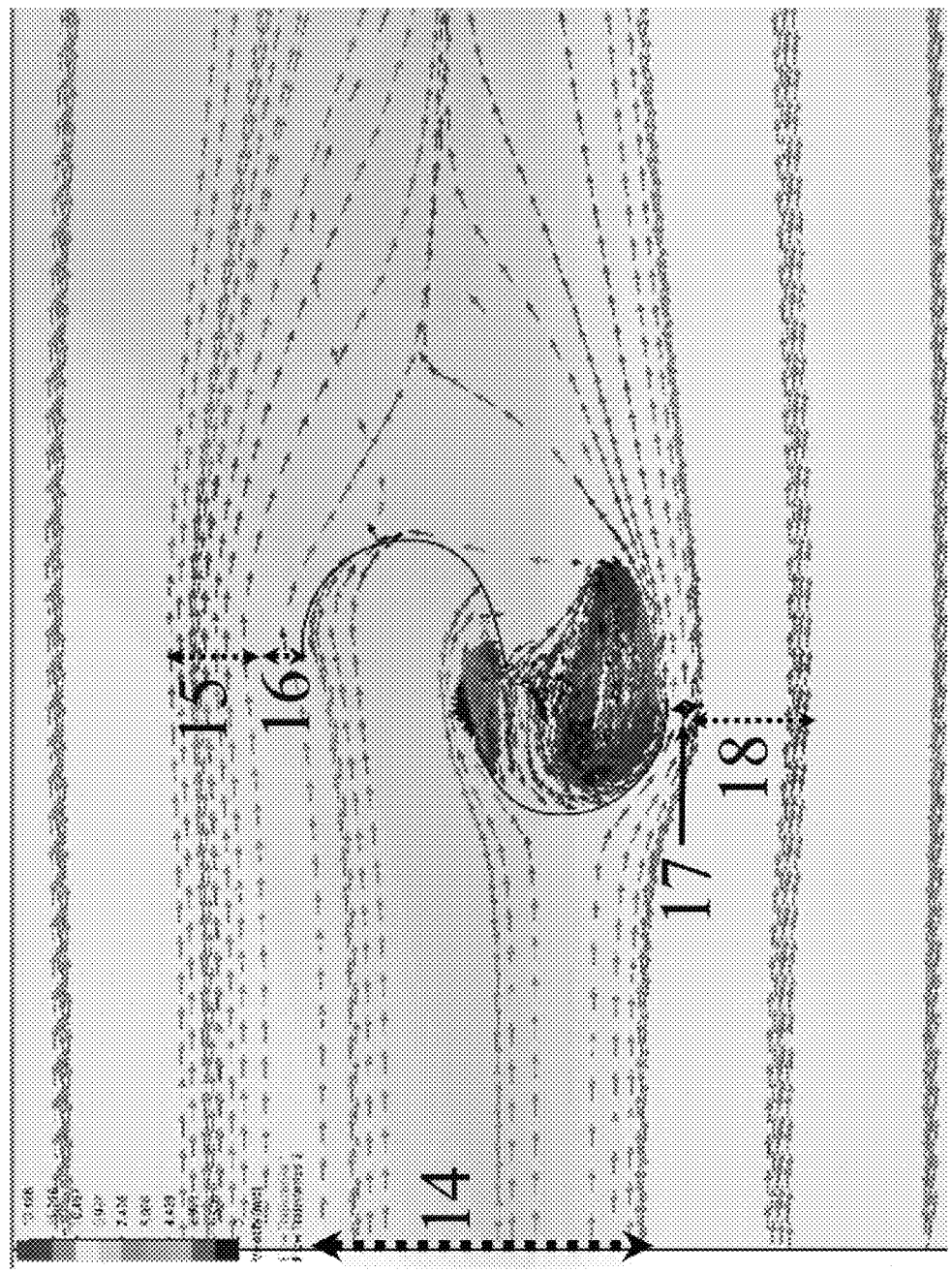
FIG. 3 is a diagram of the flow around a 2-bladed turbine in a second plane.
Figure 4:
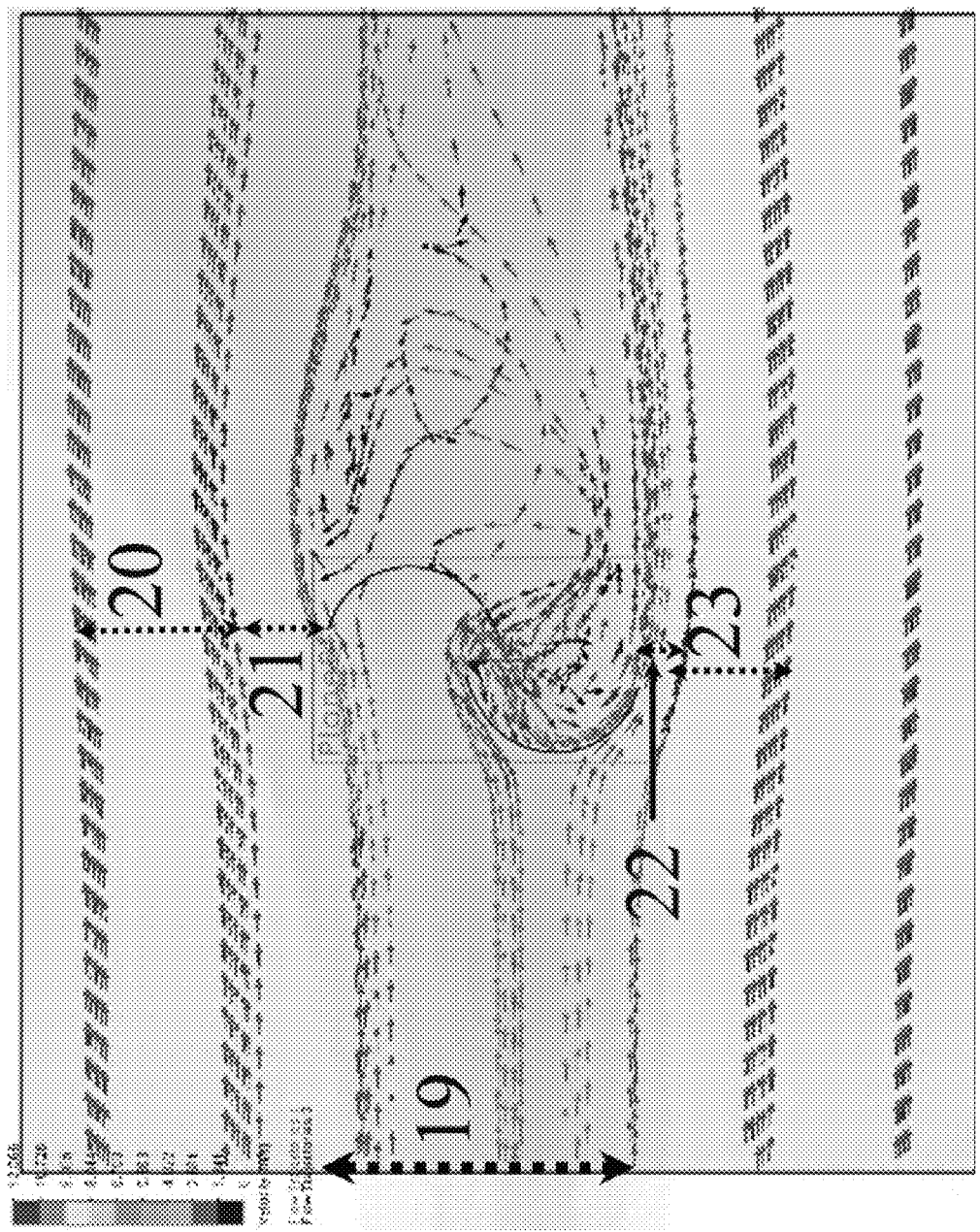
FIG. 4 is a diagram of the flow around a 2-bladed turbine in a third plane.

FIGS. 2-4 show simulations of a single drag vertical axis wind turbine with different shapes at different vertical levels. In FIGS. 2-4, the dotted lines (9), (14), (19) represent the diameters of the turbines at various heights. Distances (11), (13), (16), (17), (21), and (22) show the distances from the edge of the turbine to the areas where the wind speed recovers to that of the prevailing speed. The blades of another wind turbine centered in the areas of (10), (12), (15), (18), (20), and (23) would reap the greatest benefit from the area of wind that is greater than the prevailing speed. After the outer points of areas (10), (12), (15), (18), (20), and (23), the wind descends to prevailing speed. Note that although the diameters of the turbine differ at different levels, as this is a tapered turbine, with that of FIG. 4 being the smallest, the difference in shapes makes it so that the same distance from the shaft of the turbine at various heights is the location that experiences the increase in wind speed from the interaction of the wind with the turbine. This unique aspect of the design enables the grouping of turbines with variations in shapes.

Figure 5:
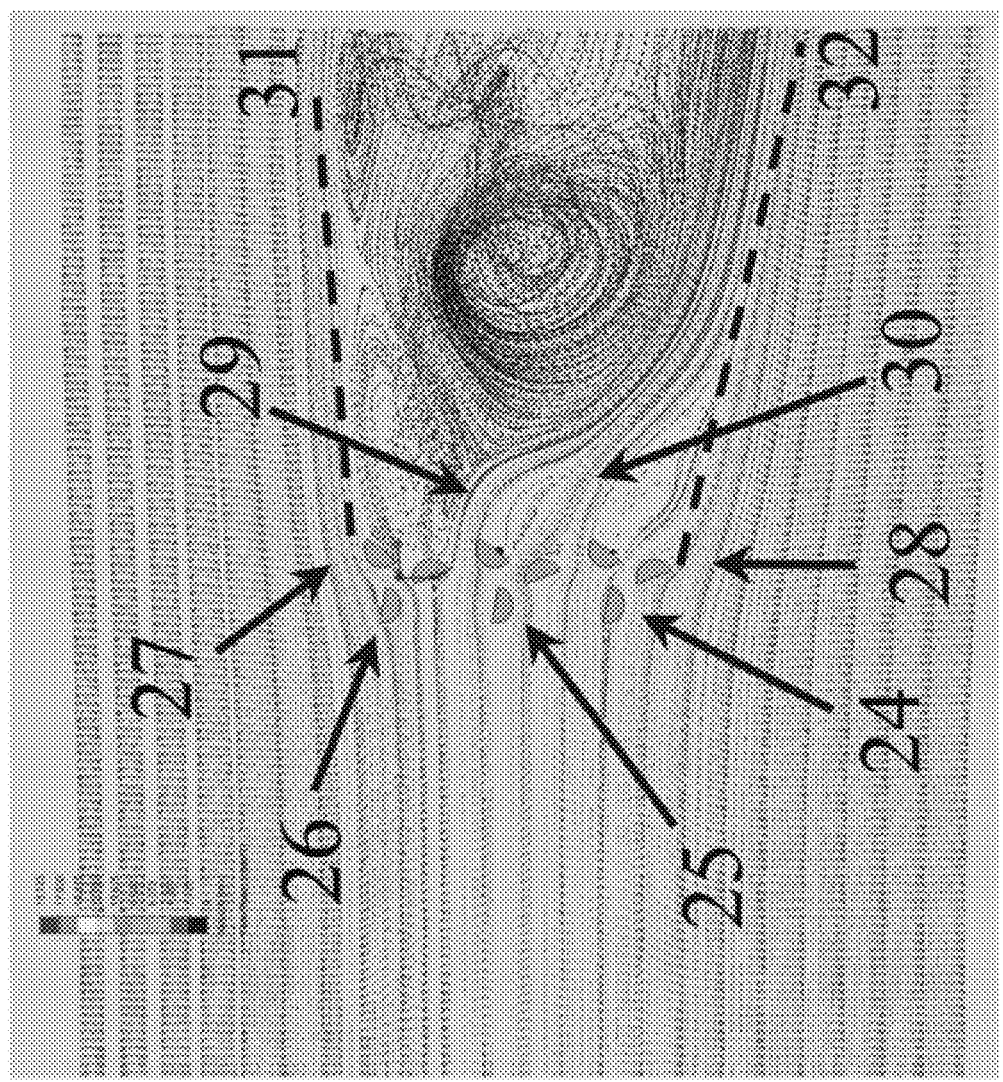
FIG. 5 is a diagram of the flow around 3 three-bladed turbines.

FIG. 5 shows the grouping of a single row of turbines that are all rotating in the same direction, in this case counter-clockwise. Turbine 1 is (24), Turbine 2 is (25), and Turbine 3 is (26). Points (27) and (28) are where the wind speed recovers to the prevailing wind speed or higher, and would be the points at which it would be ideal to place the edge of an adjacent wind turbine. The combination of similar turbines in a row achieves the displacement of the area of circular turbulence farther downwind from the first row of turbines than what occurred with one turbine alone, and allows room for a second row of turbines downwind from the first, whose blades can take advantage of funneled wind between the turbines at points 29 and 30.

In general, we see that most of the turbines should be rotating in the same direction except for ones on the outer edges of a wind farm, and that side depends on whether the turbines are rotating clockwise or counterclockwise.

Points (31) and (32) show the boundary between the turbulent wind and the higher speed non-turbulent wind. The angle is much less than with one turbine alone (6). This means that, especially in an area where the wind is coming mostly from one direction, or where there are restrictions in the areas available to place the turbines, the ideal placement is either side by side in a single row, or each one downstream from the other very slightly to the side.

Figure 6:
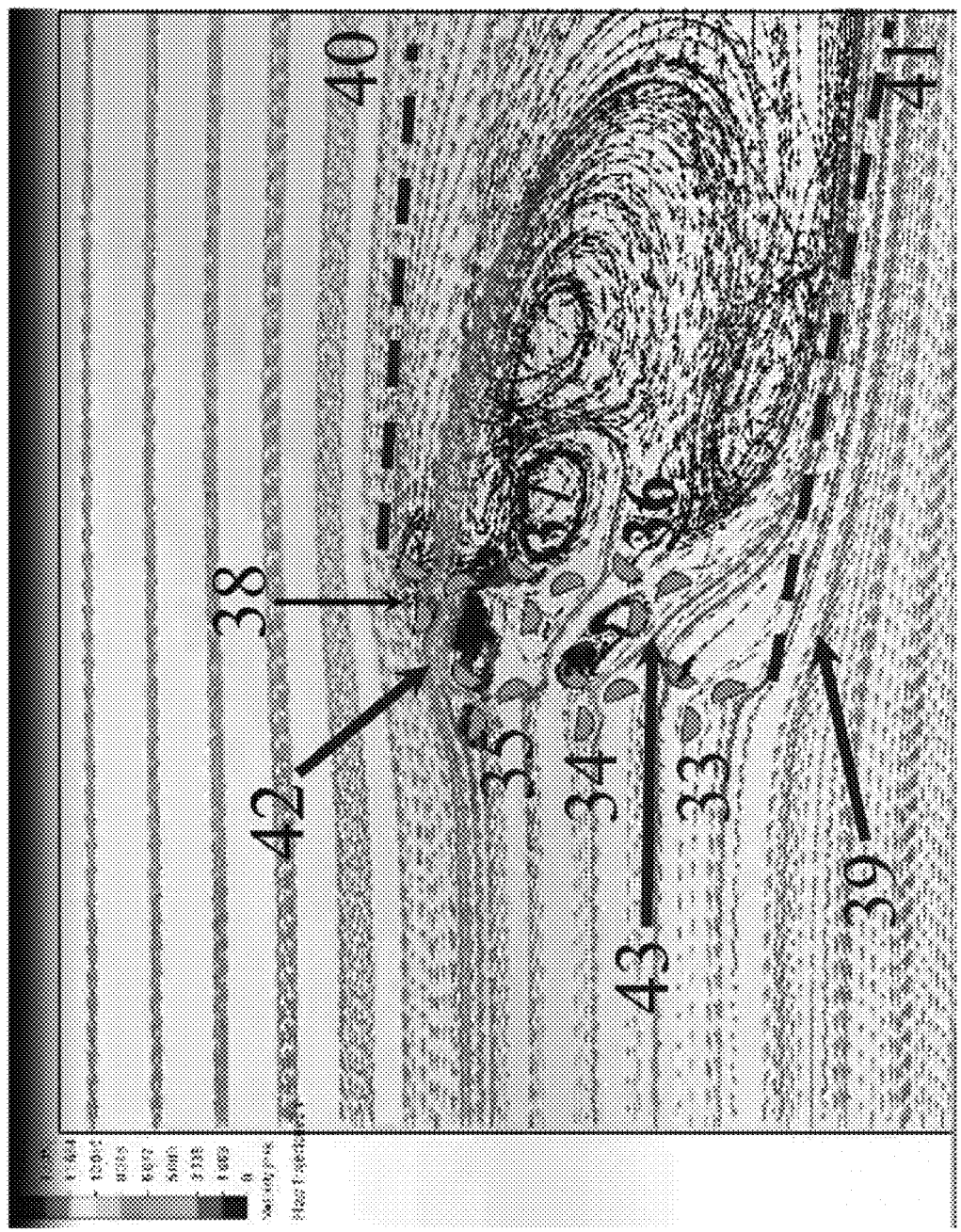
FIG. 6 is a diagram of the flow around two rows of 3 three-bladed turbines.

FIG. 6 shows two rows of three turbines each, (33) to (38). Dotted lines (40) and (41) show that the area of circular turbulence and lower wind speed becomes even more confined downwind with two rows of turbines. Turbine (38) benefits from a concentration of wind speed from stream (42). Turbine (36) benefits from stream (43).

Figure 7:
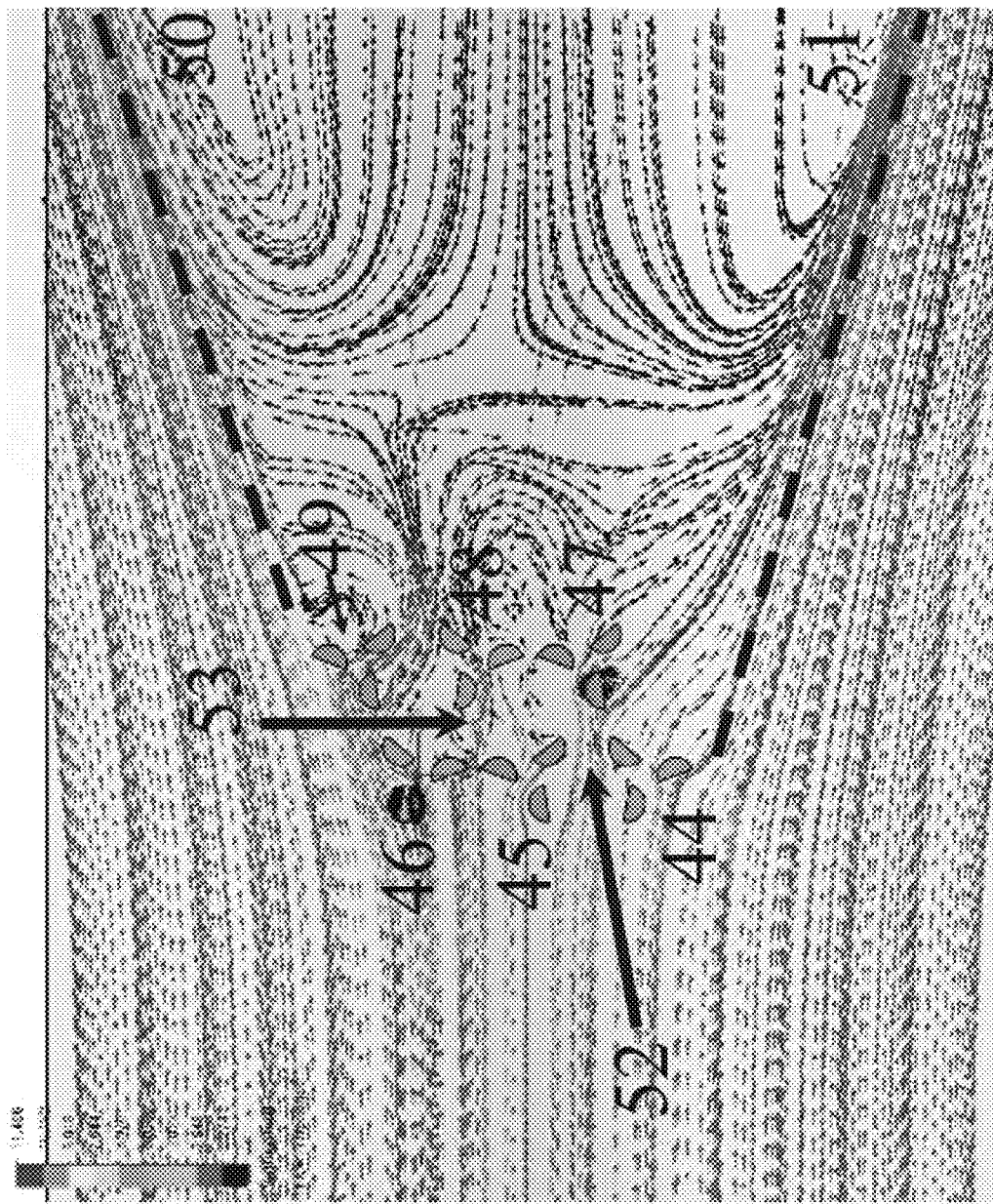
FIG. 7 is a diagram of the flow around two rows with counter-rotation.

FIG. 7 shows two rows of turbines (44) to (49), (44), (46), and (48) are rotating counterclockwise. (45), (47), and (49) are rotating clockwise in an alternating pattern. This appears to be overall an inferior approach. The angles of lines (50) and (51) are much larger. Much more space is occupied by lower speed vortices. Streams (52) and (53) show that the second row still benefits, but not as much. The conclusion is that counter-rotation only makes sense for the outer turbine—on the right when most turbines are counterclockwise, and on the left when most are clockwise. This shows clearly that the prior art referring to counter-rotation is irrelevant to drag turbines.

Figure 10:
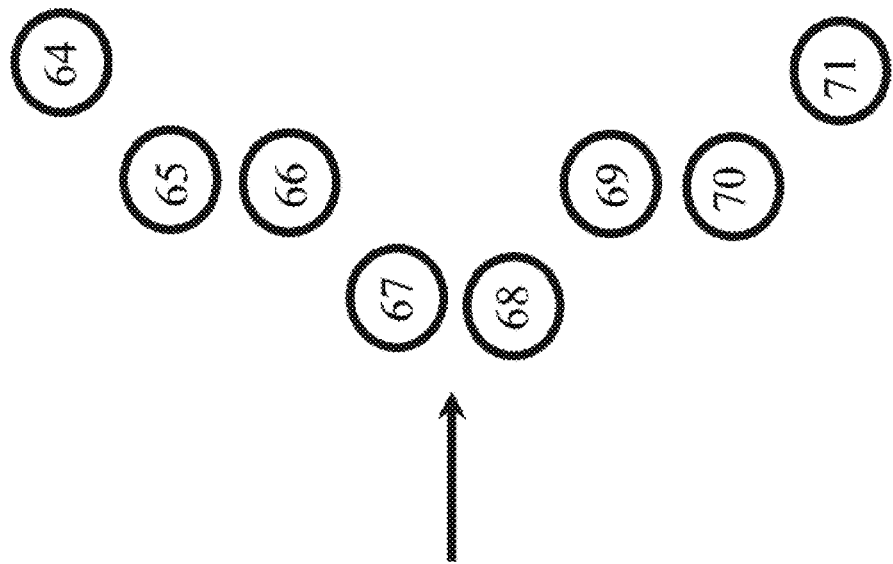
FIG. 10 is a diagram of a modified V shape wind farm design.

If a limited number of turbines are available, one of the advantageous solutions is to put them in one row in the line perpendicular to prevailing wind. Another choice is to use a V or modified V arrangement that takes advantage of downwind streams and being in the front row. FIG. 10 shows a modified V arrangement. Ideally, the first row (67, 68) has more than one turbine, because doing so confines the area of vortices more than one turbine. The same process occurs for the second row shown as turbines (65, 66, 69, 70) on each side, and so on.

The ideal formula for distance from the shaft of one turbine to the edge of the next, claimed for all turbines in a farm, in the embodiments of the first row or any two adjacent turbines in any row or from row to row, is the radius times 1.2, ranging from 1.05 to 1.6. In one embodiment, this applies to solidity (referring to the cross-sectional area covered by the blades) of 50% or greater. In another embodiment, it applies to 20% or greater. In one embodiment, this applies to turbines of diameter 1-5 meters. Another way to define it is a distance of separation of 0.2 meters plus or minus 10% from the edge of closest positions of cupped blades on two turbines. In another embodiment, the adjacent turbines counter-rotate within a row. In another embodiment, the adjacent drag turbines between one row and another counter-rotate.

In another embodiment, a microprocessor controls the coordination of the blade positions and/or orientations of adjacent turbines in a wind farm for maximal output. This was discussed above for horizontal axis turbines, but is also novel for vertical axis turbines. In another embodiment, the above configurations are placed on a rooftop. An embodiment is the placement of turbines of different type adjacent to each other. For example a 3-bladed drag vertical axis turbine could coordinate improved power output with a 2-bladed lift vertical axis turbine.

We performed some simulations for several possible arrangements:

| # of rows | Arrangement | Total footprint [m2] | Footprint per turbine [m2] | Maximal CP per turbine | Total Power (6 m/s) | Total Power (12 m/s) |
|---|---|---|---|---|---|---|
| 1 | 9 × 1 | 100 | 11 | .14 | 1.9 | 15.4 |
| 2 | 5 + 4 | 270 | 30 | .12 | 1.6 | 13.2 |
| 3 | 3 + 3 + 3 | 200 | 22 | .09 | 1.2 | 9.8 |

The table above shows that a long initial row provides the ideal combination of space consumed and power produced. Cp refers to turbine efficiency.

While the invention has been described with respect to a limited number of embodiments, it will be appreciated that many variations, modifications and other applications of the invention may be made.

What is claimed is:

1. A turbine cluster comprising:
   a turbine set of structurally unconnected, vertical axis, drag turbines, each of the turbines having two or more concave turbine blades of at least 20% solidity;
   a first, vertical axis, drag turbine of the turbine set driven by air flow of a prevailing velocity; and
   a second, vertical axis, drag turbine of the turbine set fixed in a position in which a rotation path defined by its blade tip enters a path of air flow having a speed greater than the prevailing velocity, wherein the air flow having a speed greater than the prevailing velocity is deflected from blade rotation of the first turbine, wherein the rotation path defined by the blade tip of the second turbine is disposed at a distance from a shaft center of the first turbine substantially equal to a radius length of the first turbine times 1.05-1.6 measured at a deviation angle, a first leg of the deviation angle defined by a flow direction of the prevailing air flow and a second leg of the deviation angle defined by a line traversing axes of the first turbine and the second turbine, the deviation angle ranging between 45-135°.

2. The turbine cluster of claim 1, wherein the first turbine and the second turbine are configured to rotate in an identical direction.

3. The turbine cluster of claim 1, wherein the first turbine and the second turbine are configured to rotate in opposite directions.

4. The turbine cluster of claim 1, wherein the turbine set is implemented with turbines having two blades.

5. The turbine cluster of claim 1, wherein the turbine set is implemented with turbines having three blades.

6. The turbine cluster of claim 1, wherein the two or more concave turbine blades have at least 60% solidity.

7. The turbine cluster of claim 1, wherein the second turbine includes a processor, with memory that receives information on at least the blade positions of both turbines and wind speed and direction, and coordinating by means of the processor output the position of the blades in respect to blades on the first turbine.

8. A method for capturing air flow in turbine clusters, the method comprising:
providing a turbine set of structurally unconnected, vertical axis, drag turbines, each of the
turbines having two or more concave turbine blades of at least 20% solidity;
driving a first, vertical axis, drag turbine of the turbine set with an air flow of a prevailing velocity; and
driving a second, vertical axis, drag turbine of the turbine set fixed in a position in which a rotation path defined by its blade tip enters a path of air flow having a speed greater than the prevailing velocity, wherein the air flow having a speed greater than the prevailing velocity is deflected from blade rotation of the first turbine, wherein the rotation path defined by the blade tip of the second turbine is disposed at a distance from a shaft center of the first turbine substantially equal to a radius length of the first turbine times 1.05-1.6 measured at a deviation angle, a first leg of the deviation angle defined by a flow direction of the prevailing air flow and a second leg of the deviation angle defined by a line traversing axes of the first turbine and the second turbine, the deviation angle ranging between 45-135°.

9. The method of claim 8, wherein the first turbine and the second turbine are configured to rotate in an identical direction.

10. The method of claim 8, wherein the first turbine and the second turbine are configured to rotate in opposite directions.

11. The method of claim 8, wherein the turbine set is implemented with turbines having two blades.

12. The method of claim 8, wherein the turbine set is implemented with turbines having three blades.

13. The method of claim 8, wherein the two or more concave turbine blades have at least 60% solidity.

14. The method of claim 8, wherein the second turbine includes a processor, with memory that receives information on at least the blade positions of both turbines and wind speed and direction, and coordinating by means of the processor output the position of the blades in respect to blades on the first turbine.

\* \* \* \* \*